Jan. 10, 1928.
G. A. LANE
GAS METER
Filed March 28, 1927
1,655,654
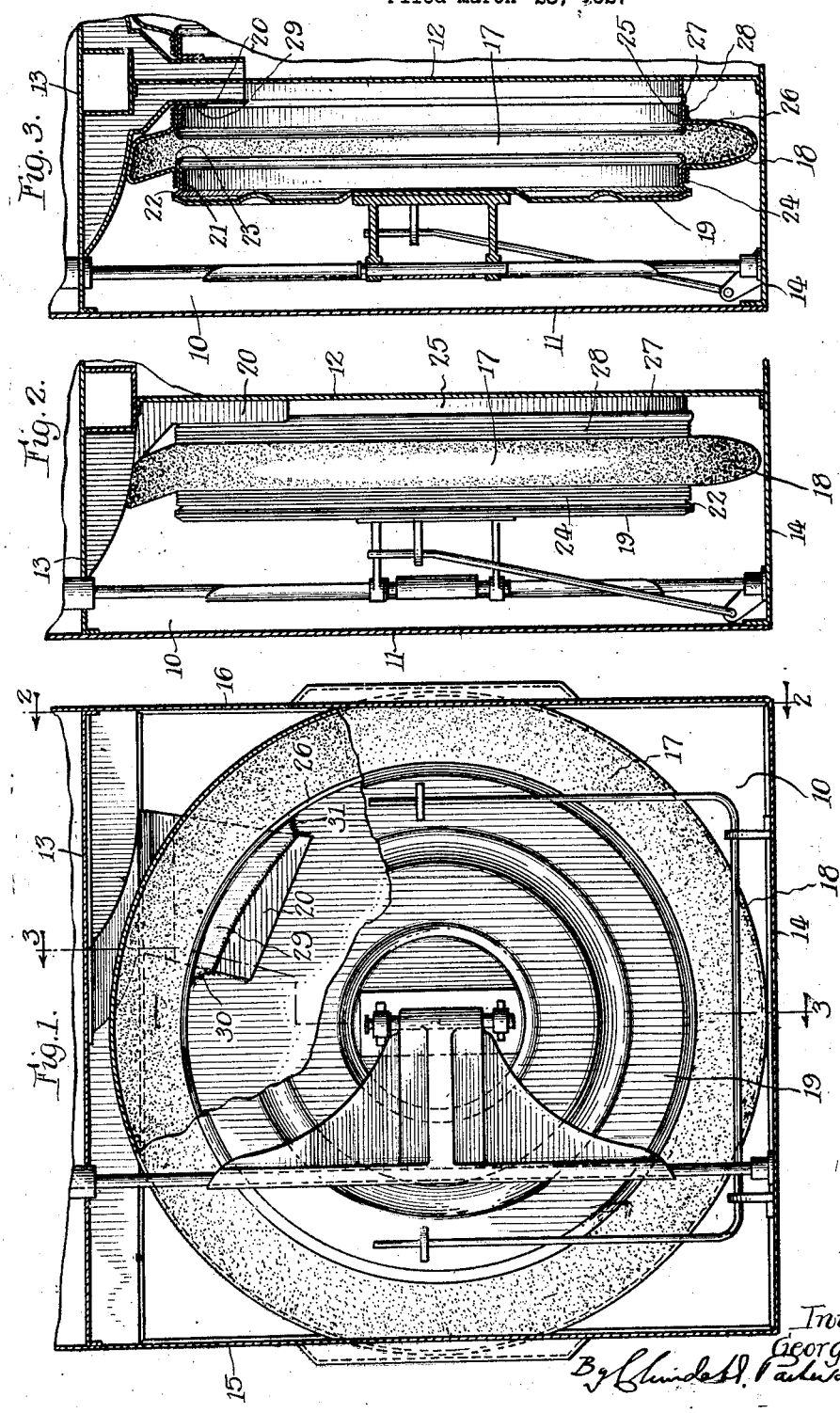
Inventor:
George A. Lane, Patented Jan. 10, 1928.

1,655,654

UNITED STATES PATENT OFFICE.

GEORGE A. LANE, OF CHICAGO, ILLINOIS.

GAS METER.

Application filed March 28, 1927. Serial No. 178,955.

The present invention relates to improvements in gas meters, particularly gas meters of the diaphragm type.

In meters of this type, a diaphragm chamber is mounted inside a closed gas compartment. The diaphragm chamber comprises a suitable bellows, commonly made of leather, one end of which is secured tightly to a fixed wall in the gas compartment, and the other end of which is closed by a movable diaphragm disc. The primary object of the invention resides in the provision of new and improved means for fastening the bellows to a fixed wall.

In the gas meter, a single gas passage defined by a flat duct lying next to the fixed wall in the compartment, opens into the diaphragm chamber. To make the diaphragm chamber substantially gas tight, it is common practice to secure the bellows to a ring flange which is soldered to the fixed wall and the gas duct. A notch is cut in the outer edge of the ring flange to fit over the duct, thus bringing the bellows close to the soldered seam at this point. In soldering the flange to the duct, it is practically impossible to avoid contacting occasionally the leather of the bellows with the hot soldering iron. Since the seam or joint is in close proximity to the leather, the hot solder frequently flows against the leather, or heat is conducted from the solder through the small amount of metal separating the solder from the leather to the latter. Hence, the bellows is often scorched or burned. In many instances, the resultant defect is hard to detect, and hence often is not discovered until after the meter is installed and in service, thus causing considerable inconvenience, annoyance and expense. It is, therefore, an important object of my invention to provide a novel bellows fastening means which is so formed that it is adapted to be soldered to the gas duct at a point sufficiently remote from the bellows to prevent injury to the latter.

A more specific object resides in the provision of a novel bellows fastening flange having one edge turned laterally to provide a notch adapted to fit over the gas duct leading to the diaphragm chamber.

Further objects and advantages will become apparent as the description proceeds.

In the accompanying drawings:

Figure 1 is a fragmentary sectional view through a gas meter showing the diaphragm chamber partially in end elevation.

Fig. 2 is a transverse sectional view taken along line 2—2 of Fig. 1, and showing the diaphragm chamber in side elevation.

Fig. 3 is a transverse sectional view taken along the broken line 3—3 of Fig. 1.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more specifically to the exemplary embodiment of the invention illustrated in the drawings, the gas meter comprises a closed gas compartment or chamber 10. In the present instance, this chamber is formed by front wall 11 and a rear wall 12, a top wall 13, a bottom wall 14 and side walls 15 and 16. The chamber 10 is provided with a suitable passage (not shown) opening therefrom for permitting the ingress and egress of gas through valve control.

Mounted in the compartment 10 is a diaphragm chamber 17 of any suitable form. This diaphragm chamber comprises a bellows 18 of any suitable material, such as leather. Of the bellows 18, one end is closed by a fixed diaphragm disc which in the present instance is the rear wall 12 of the compartment 10, and the other end is closed by a movable diaphragm disc 19. A suitable gas duct 20, which in the present instance is flat and lies next to the wall 12, opens into the diaphragm chamber 17 to permit the ingress and egress of gas under valve control.

In operating the gas meter, the movable diaphragm disc 19 moves in and out due to difference in the pressures in the compartment 10 and the chamber 17, and changing of the higher pressure alternately from one to the other. This difference is effected by connecting the compartment 10 and the chamber 17 alternately and successively to the gas inlet and the gas outlet of the meter through valve means actuated by movement of the disc 19. The valve means is not fully disclosed herein since it forms no part of the present invention.

To obtain accuracy, it is necessary that the chamber 17 be closed tight. To this end, the diaphragm disc 19 is soldered to the outer edge of a ring flange 21 which is formed with spaced outwardly formed peripheral beads or ribs 22 and 23. The outer edge of the bellows 18 is secured to the ring flange 21 between the beads 22 and 23 by any suitable means, such as a cord 24 wound repeatedly around the same to hold it tightly against the flange. A ring flange 25 having spaced outwardly formed peripheral beads or ribs 26 and 27 is provided for securing the rear or inner end of the bellows 18 to the wall 12. The bellows 18 is secured to the flange 25 between the beads 26 and 27 by suitable means, such as a cord 28. The ring flange 25 is soldered at one edge to the wall 12.

To provide a suitable space or opening for the gas duct 20, the rear edge of the flange 25 is turned in to form a laterally inwardly extending flange or lip 29 resting against the outer surface of the duct. The ends of the lip 29 are drawn from the body of the flange 25 to provide fillets 30 and 31 so as to insure a good seal at these points. The lip 29 and the fillets 30 and 31 are soldered at their inner edges to the top and sides of the duct 20. In constructing the gas meter this is done before the disc 19 is soldered to the ring flange 21.

It will be evident that by turning the lip 29 inwardly, the soldered seam with the duct 20 is on the side of the flange 25 opposite to the bellows 18, and is located a substantial distance from the bellows. As a result the flange 25 can be soldered to the duct 20 without scorching, burning, or injuring the bellows 18. The construction is simple and inexpensive, and increases the efficiency and durability of the meter.

I claim as my invention:

1. In a gas meter, in combination, a fixed wall, a flat duct lying next to said wall, a ring flange soldered at one end to said wall and having an inturned flange soldered at its inner edge to the outer surface of said duct, and a diaphragm bellows secured to the outer side of said first mentioned flange.

2. In a gas meter, in combination, a flat fixed wall, a flat duct lying next to said wall, a ring flange secured to said wall over said duct, said flange having a lip on one side struck laterally therefrom to provide a space for said duct, said lip being soldered to said duct, and a bellows secured to the other side of said flange.

3. In a gas meter, in combination, a wall, a duct lying next to said wall and secured thereto, a ring shaped securing member lying flat against said wall and secured thereto, said ring shaped member having a lip struck laterally therefrom to provide a space for said duct, said lip being secured to said duct, and a flexible membrane secured to said member on the side opposite said lip.

4. In a gas meter, in combination, a wall, a ring flange secured to said wall, a duct extending through said flange into the space circumscribed thereby, said flange having a portion of its wall struck laterally to provide a suitable opening for said duct, said struck portion being secured to said duct, and a flexible membrane secured to said flange on the side opposite said struck portion.

5. In a gas meter, in combination, a flat plate, a flange member secured to said plate and extending laterally therefrom, a portion of the inner edge of said flange member being bent laterally to provide an opening therein, a duct extending through said opening, the ends of said bent portion being drawn from the body of said flange member to provide end fillets, and a flexible membrane secured to said flange member.

6. In a gas meter, in combination, a flat plate, a flange member secured to said plate and extending laterally therefrom, a portion of the inner edge of said flange member being bent inwardly to provide an opening in said flange member, a duct extending through said opening, the ends of said bent portion being drawn from the body of said flange member to provide end fillets, the edges of said bent portion and said fillets being soldered to said duct, and a flexible membrane secured to the outside of said flange member.

In testimony whereof, I have hereunto affixed my signature.

GEORGE A. LANE.